United States Patent [19]
Elmore et al.

[11] Patent Number: 6,143,809
[45] Date of Patent: Nov. 7, 2000

[54] PROCESS TO PREPARE AQUEOUS DISPERSIONS OF EPOXY RESINS

[75] Inventors: Jimmy D. Elmore, Houston; Vincent James Maksymowski, Pearland; Richard William Henning, Jr., Sealy; Ernest Charles Galgoci, Jr., Sugar Land, all of Tex.

[73] Assignee: Shell Oil Company, Houston, Tex.

[21] Appl. No.: 09/116,922

[22] Filed: Jul. 17, 1998

[51] Int. Cl.[7] .................. C08K 3/20; C08L 63/02
[52] U.S. Cl. .......... 523/428; 523/404; 523/420; 523/426; 525/526; 525/533
[58] Field of Search .................. 524/366, 367, 524/220, 243, 239; 523/404, 420, 428 426; 525/526, 533

[56] References Cited

U.S. PATENT DOCUMENTS

| | | | |
|---|---|---|---|
| 3,280,054 | 10/1966 | Gotze et al. | 260/18 |
| 3,474,056 | 10/1969 | Schneider et al. | 260/18 |
| 3,870,666 | 3/1975 | Becker | 260/21 |
| 4,122,067 | 10/1978 | Anderson | 528/89 |
| 4,315,044 | 2/1982 | Elmore et al. | 427/386 |
| 4,423,166 | 12/1983 | Moriarity et al. | 523/414 |
| 5,017,675 | 5/1991 | Marten et al. | 528/111 |
| 5,118,729 | 6/1992 | Piechocki | 523/404 |
| 5,166,423 | 11/1992 | Fried | 562/537 |
| 5,236,974 | 8/1993 | Dreischhoff et al. | 523/403 |
| 5,250,727 | 10/1993 | Fried | 562/540 |
| 5,319,004 | 6/1994 | Marten et al. | 523/404 |
| 5,356,961 | 10/1994 | Nishimura et al. | 523/414 |
| 5,478,872 | 12/1995 | Yamasoe et al. | 524/45 |
| 5,494,705 | 2/1996 | Yamasoe et al. | 427/327 |
| 5,596,030 | 1/1997 | Walker | 523/404 |
| 5,602,193 | 2/1997 | Stark | 523/403 |
| 5,643,976 | 7/1997 | Arora et al. | 523/404 |
| 5,741,835 | 4/1998 | Stark | 523/403 |
| 5,750,595 | 5/1998 | Arora et al. | 523/404 |
| 5,786,429 | 7/1998 | Allen | 525/430 |
| 5,874,490 | 2/1999 | Arora et al. | 523/414 |

FOREIGN PATENT DOCUMENTS

| | | |
|---|---|---|
| 0000605 A1 | 7/1978 | European Pat. Off. . |
| 0770635 A2 | 5/1997 | European Pat. Off. . |
| 2332177 | 2/1974 | Germany . |
| 6-287276 | 10/1994 | Japan . |
| WO 96/06876 | 3/1996 | WIPO . |
| WO 96/20978 | 7/1996 | WIPO . |
| WO 99/09089 | 2/1999 | WIPO . |

OTHER PUBLICATIONS

International Search Report of for PCT/EP99/04925 (Nov. 1999).

*Primary Examiner*—Robert Dawson
*Assistant Examiner*—D. Aylward

[57] ABSTRACT

A process to provide an aqueous dispersion is provided comprising the steps of:

a) emulsifying a mixture comprising
 i) water,
 ii) at least one epoxy resin having a functionality of greater than 0.8 epoxide group per molecule,
 iii) from 0.1 to 20 weight percent, based on the epoxy resin, of at least one polyoxyalkylene surfactant, and
 iv) optionally an acetone-free solvent solution to produce a resin-surfactant emulsion; and b) adding a solvent mixture to said resin-surfactant emulsion, said solvent mixture comprising i) acetone and ii) a non-volatile hydrophobic liquid resin or resin modifier to produce the aqueous dispersion.

14 Claims, No Drawings

PROCESS TO PREPARE AQUEOUS DISPERSIONS OF EPOXY RESINS

FIELD OF INVENTION

This invention relates to a process to prepare aqueous dispersions of epoxy resins. In one aspect, the invention relates to improve aqueous dispersions of epoxy resins, which provide improved coating properties.

BACKGROUND OF THE INVENTION

Aqueous dispersions of epoxy resins have been known for many years. However, the performance of these dispersions as elements of coatings has been viewed as inferior to their solvent borne counterparts. It is known that the surfactants employed to render the epoxy component emulsifiable such as nonylphenol ethoxylates, alkylphenol initiated poly(oxyethylene) ethanols, alkylphenol initiated poly(oxypropylene) poly(oxyethylene) ethanols, and block copolymers containing an internal poly(oxypropylene) block and two external poly(oxyethylene) ethanol blocks readily migrate to surface interfaces where, it is speculated, they deleteriously affect film performance.

Further as aqueous dispersions of epoxy resins have become more widely used in industry, improved handling properties such as storage stability, uniformity, small particle size, higher inversion temperature, viscosity reproducibility, and ease of transferring the dispersions become more desirable. Therefore, there is a growing need for aqueous dispersions of epoxy resins that have improved, user friendly handling properties.

SUMMARY OF THE INVENTION

According to the invention, a process to provide an aqueous dispersion is provided comprising the steps of:
a) emulsifying a mixture comprising
   i) water,
   ii) at least one epoxy resin having a functionality of greater than 0.8 epoxide group per molecule,
   iii) from 0.1 to 20 weight percent, based on the epoxy resin, of at least one polyoxyalkylene surfactant, and
   iv) optionally an acetone-free solvent solution to produce a resin-surfactant emulsion; and
b) adding a solvent mixture to said resin-surfactant emulsion, said solvent mixture comprising i) acetone and ii) a non-volatile hydrophobic liquid resin or resin modifier to produce the aqueous dispersion.

DETAILED DESCRIPTION OF THE INVENTION

It has been found that by using a certain solvent combination in a certain process with a polyoxyalkylene surfactant an effective aqueous epoxy resin dispersion can be formed. The process of the invention provides an epoxy resin dispersion having a relatively uniform particle size, and an average particle size of generally less than $1\mu$ that has good shelf-life and handling properties. These dispersions are stable, retaining consistent viscosity and epoxy functionality for suitable periods of time and provides good gloss for the coating compositions. Further, it has been found that process time can be reduced substantially by using the process of the invention.

Polyoxyalkylene Surfactant

The polyoxyalkylene surfactants useful in the invention process are any surfactant containing a polyoxyalkylene moiety preferably having a molecular weight in the range of from 500 to 40,000. Such polyoxyalkylene moiety is preferably polyoxyethylene or polyoxyethylene-oxypropylene block copolymer. The polyoxyalkylene surfactant can be a reacted into the epoxy resin such as those disclosed in U.S. Pat. Nos. 4,315,044; 5,602,193, and 5,741,835 which are hereby incorporated by reference or blended. Preferable surfactants include, for example, polyoxyethylene glycol or polyoxyethyleneoxypropylene glycol such as Pluronic F88 (BASF); addition products or reactants comprising diglycidyl ether of dihydric phenol, dihydric phenol and a diglycidyl ether of polyoxylakylene glycol such as disclosed in U.S. Pat. No. 4,315,044; addition products or reactants comprising epoxy resins and oxidized polyoxyalkylene glycol such as disclosed in U.S. Pat. Nos. 5,602,193 and 5,741,835; condensation products of polyethylene glycol and an diepoxy resin such as disclosed in U.S. Pat. Nos. 4,122,067 and 5,236,974 which are hereby incorporated by reference; or an epoxy-functional surfactant prepared by reacting (i) at least one amidoamine having the structures:

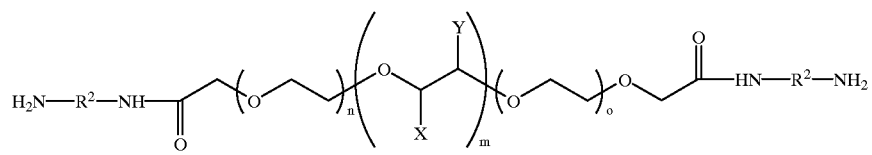

(I)

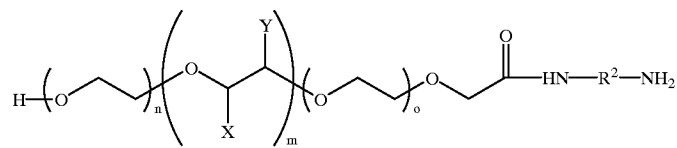

(II)

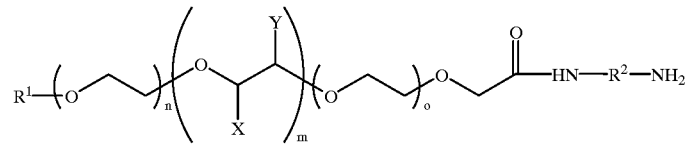

(III)

wherein R¹ is an alkyl, aryl, or alkylaryl group having 1 to 15 carbon atoms, preferably $C_1$–$C_4$ alkyl or nonylphenyl, most preferably methyl, R² is aliphatic, cycloaliphatic, or aromatic group having 2 to 18 carbon atoms optionally containing non-reactive oxygen or nitrogen atoms in the backbone, X and Y are independently a hydrogen, methyl or ethyl group with the provision that if X is methyl or ethyl, Y is hydrogen or if Y is methyl or ethyl, X is hydrogen and n+m+o is a real number from 40 to 400, m is a real number from 0 to 70, preferably from 0 to 50, most preferably 0, and n+o is a real number in an amount effective to provide resin emulsification which is at least 15 and in a ratio of (I) to (II) by weight in the range of 100:0 to 0:100, a ratio of (I) to (III) by weight in the range of 100:0 to 0:100, and a ratio of (II) to (III) by weight in the range of 100:0 to 0:100, and (ii) at least one epoxy resin having a functionality greater than 0.8 epoxide group per molecule. The epoxy-functional amidoamine surfactant preferably has a molecular weight within the range of from 1,700 to 40,000, preferably to 20,000. In formula (I), preferably m is a real number from 0 to 70 and n and o are independently a real number from 5 to 395. In formula (II), preferably m is a real number from 0 to 70, n is a real number from 0 to 395, and o is a real number from 0 to 400, more preferably from 20 to 380. In formula (III), preferably m is a real number from 0 to 70, n is a real number from 0 to 395, and o is a real number from 0 to 400, more preferably from 20 to 380. In all of the above formulae (I), (II), and (III), n+o must be a real number in an amount effective to provide resin emulsification which is typically at least 15, preferably at least 35. In one preferred embodiment, m is 0.

In one of the preferred embodiments, the epoxy-functional surfactant can be prepared by reacting amidoamine of structures (I) and (II) in a ratio of (I) to (II) by weight in the range of 99:1 to 1:99, preferably in the range of 20:80 to 80:20, and at least one epoxy resin.

For the epoxy-functional surfactant, the amidoamine is contacted with the epoxy resin under conditions effective to react the amine group and the epoxide group. Typically, the equivalent ratio of the amine to epoxy is at least 1:2, preferably in the range of from 1:6 to 1:500. The reaction is typically carried out at a temperature from ambient temperature to an elevated temperature sufficient to react the amine group and the epoxide group preferably in the range of from 50° C. to 150° C. for a time effective to produce the reaction products. The progress of the reaction can be monitored and targeted to produce the desired product by measuring the amine equivalent weight and the epoxy equivalent weight of the reactant mixture. Generally, the reaction mixture is heated until the epoxy equivalents equal to the amine equivalents added are consumed which is generally one hour or greater. stepwise or at the same time in any order. If desired the surfactant can be recovered from the reaction mixture or made "in-situ." More than one epoxy resin can be reacted with the amidoamine. The preferred amidoamine can be prepared by reacting an acid-terminated polyalkyleneglycol-containing compound having the formula

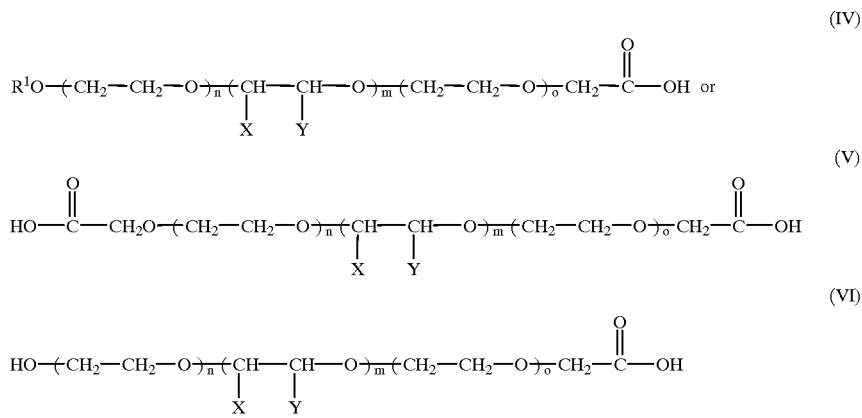

wherein R¹ is an alkyl, aryl, or arylalkyl group having 1 to 15 carbon atoms, n, m, and o are as described above, and at least one diamine in an amine to acid equivalent ratio of 6:1 to 25:1. Preferred diamine has the formula:

wherein R² is as defined above. Examples of suitable diamines include for example, m-xylylenediamine, 1,3-bisaminomethylcyclohexane, 2-methyl-1,5-pentanediamine, 1-ethyl-1,3-propanediamine, ethylenediamine, diethylenetriamine, triethylenetetramine, polyoxypropylenediamines, 2,2(4),4-trimethyl-1,6-hexanediamine, isophorone diamine, 2,4(6)-toluenediamine, 1,6-hexanediamine, and 1,2-diaminocyclohexane.

The acid-terminated polyalkyleneglycol-containing compound or oxidized polyalkylene glycol can be produced by oxidation of a polyethylene glycol monoalkylether or a monoalkylether of a block copolymer of ethylene oxide and propylene oxide or butylene oxide ("polyalkylene glycol") or by at least a partial oxidation of a polyethylene glycol, or a block copolymer of ethylene oxide and propylene oxide or polybutylene oxide ("polyalkylene glycol").

The acid-terminated polyalkyleneglycol-containing compounds or oxidized polyalkyleneglycol can be produced by oxidation of the polyalkylene glycols including, but not limited to, the processes described in U.S. Pat. Nos. 5,250,727 and 5,166,423. Generally, oxygen-containing gas is added to the polyalkylene glycol in the presence of a free radical (e.g., 2,2,6,6-tetramethyl-1-piperidinyloxy) and an inorganic acid (e.g., nitric acid) to produce the carboxylic acid until at least one hydroxyl group per molecule, or if diacid-terminated polyalkyleneglycol is desired substantially all of the alcohol groups, are oxidized to carboxylic acid groups. Acid-terminated polyalkyleneglycol-containing compound can also be made by Williamson ether synthesis where a polyalkyleneglycol is reacted with chloroacetic acid and/or esters in the presence of a base.

The epoxy resins useful in producing the surfactants can be any reactive epoxy resin having a 1,2-epoxy equivalency (functionality) preferably, on the average, greater than 0.8 epoxide group per molecule, in some application preferably at least 1.5, to preferably 6.5 epoxide groups per molecule. The epoxy resin can be saturated or unsaturated, linear or branched, aliphatic, cycloaliphatic, aromatic or heterocyclic, and may bear substituents which do not materially interfere with the reaction with the carboxylic acid. Such substituents can include bromine or fluorine. They may be monomeric or polymeric, liquid or solid, but are preferably liquid or a low melting solid at room temperature. Suitable epoxy resins include glycidyl ethers prepared by reacting epichlorohydrin with a compound containing at least 1.5 aromatic hydroxyl groups carried out under alkaline reaction conditions. Examples of other epoxy resins suitable for use in the invention include monoepoxies, diglycidyl ethers of dihydric compounds, epoxy novolacs and cycloaliphatic epoxies. Generally epoxy resins contain a distribution of compounds with a varying number of repeat units. Further, the epoxy resin can be a mixture of epoxy resins. In one such embodiment, the epoxy resin can comprise a monoepoxide resin and a di- and/or a multi-functional epoxy resin, preferably an epoxy resin having a functionality of from 0.7 to 1.3 and an epoxy resin having a functionality of at least 1.5, preferably at least 1.7, more preferably from 1.8 to 2.5. The mixture can be added or reacted with the amidoamine stepwise or simultaneously.

Commercial examples of preferred epoxy resins include, for example, EPON® Resins DPL-862, 828, 826, 825, 1001, 1002, EPONEX® Resin 1510, HELOXY® Modifiers 32, 62, 63, 64, 65, 67, 68, 71, 107, 116, EPON® Resin DPS155, EPON® Resin HPT 1050 and CARDURA® Resin E-10 all available from Shell Chemical Company and Union Carbide Epoxy Resins ERL-4221, -4289, -4299, -4234 and -4206.

Epoxy Resin Component

The epoxy resin component can be any epoxy resin having a functionality of greater than 0.8 epoxide group per molecule, preferably at least 1.2 epoxide group per molecule, preferably at most to 6.5 epoxide group per molecule. These epoxy resins include those mentioned above for use in preparing the surfactant. Suitable epoxy resins include glycidyl ethers prepared by reacting epichlorohydrin with a compound containing, on the average, greater than one hydroxyl group carried out under alkaline reaction conditions. Examples of epoxy resins suitable for use in the invention include in addition to the epoxy resins mentioned above, polyglycidyl esters of polycarboxylic acids, and glycidylmethacrylate-containing acrylic resin. Polyglycidyl esters of polycarboxylic acids are mentioned below.

Aqueous Epoxy Resin Dispersions

In a typical process to prepare the aqueous dispersion, the amount of the epoxy resin component ii) is from 20 to 75 percent by weight, preferably from 55 to 65 percent by weight, based on the total dispersion. Generally, i) water and ii) an epoxy resin having a functionality of greater than 0.8 epoxide group per molecule are mixed under conditions effective to provide an oil-in-water emulsion in the presence of iii) from 0.1, preferably from 0.5, more preferably from 1, to 20, most preferably to 6 weight percent, based on the epoxy resin of at least one polyoxyalkylene surfactant mentioned above and optionally iv) an acetone-free solvent solution to produce a resin-surfactant emulsion. To this emulsion, a solvent mixture comprising i) acetone and ii) a non-volatile hydrophobic liquid resin or resin modifier is added to produce the aqueous dispersion. It has been found that by adding the solvent mixture after the formation of the emulsion (inversion) accelerates the time to provide a aqueous dispersion having the suitable particle size of less than $1\mu$ and consistency to provide good gloss for the final coating product. Thus, it is beneficial to add the solvent before it reaches the target particle size to reduce process time.

Acetone is preferably present in an amount of from 0.5, more preferably from 1, up to preferably 5, more preferably up to 3% of the total aqueous dispersion. The non-volatile hydrophobic liquid resin or resin modifier is present in an amount of 1 to 25%, preferably 1 to 3%, based on the total amount of components a)ii), a)iii), and b)ii).

The hydrophobic liquid resin or resin modifier can be any non-volatile, hydrophobic compound which is liquid, flowable at room temperature, whether neat or in a hydrophobic solution such as xylene or butanol. A substance is non-volatile when it meets the definition according to ASTM D 2369-93 or ASTM D 3960-93. For a coating composition, the hydrophobic liquid resin or resin modifier must be compatible (e.g. does not detract from corrosion resistance, or high gloss, etc.) with the curing agents in the coating composition, for example, such as amine curing agents. Preferable hydrophobic liquid resin or resin modifier includes, for example, an aliphatic monoglycidylether, urea formaldehyde resin or an aliphatic monoglycidylester. Preferable hydrophobic liquid resin or resin modifier can be, for example, HELOXY® 7 Modifier (alkyl $C_8$–$C_{10}$ glycidyl ether), HELOXY® 9 Modifier ($C_{10-11}$ alkyl glycidylether) available from Shell Chemical Company and BEETLE® 216-10 Resin (alkylated urea formaldehyde high solids solution from Cytec Industries Inc).

These dispersions can be made by adding the surfactant and water to the epoxy resin to be dispersed or by producing the surfactant "in-situ" as described above. These dispersions can also be made by adding the epoxy resin to the amidoamine precursor and water. The surfactant can be produced in-situ by adding amidoamine precursor to the epoxy resin at an effective temperature to react the amidoamine and epoxy resin, or by adding the amidoamine precursor to a difunctional epoxy resin and dihydric phenol before or during the advancement reaction as described above.

The epoxy resin coating composition of the invention may include other additives, such as elastomers, stabilizers, extenders, plasticizers, pigments, pigment pastes, antioxidants, leveling or thickening agents, defoaming agents and/or cosolvents, wetting agents, cosurfactants, reactive diluents, fillers, catalysts, and the like. The aqueous dispersion can contain a monoepoxide diluent as reactive diluent.

Preferable monoepoxide diluents are those which contain a water-immiscible glycidated $C_{8-20}$ aliphatic alcohol, $C_{1-8}$ alkylphenol glycidylether, or glycidated versatic acid. The monoepoxide component can contain alicyclic and aromatic structures, as well as halogen, sulfur, phosphorus, and other such heteroatoms. Reactive diluents can be, for example, epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_{8-14}$ aliphatic alcohols.

Useful coating compositions can be obtained by mixing an amine-functional epoxy resin curing agent with the aqueous epoxy resin dispersion mentioned above.

Curing Agent

The epoxy resin curing agent can be any curing agent effective to cure (or crosslink) the epoxy resin dispersed in the aqueous solution. These curing agents are generally water compatible (i.e., dilutable and/or dispersable). Suitable curing agents for use with the dispersions include those typically employed with epoxy resins, such as aliphatic, araliphatic and aromatic amines, polyamides, amidoamines and epoxy-amine adducts. They exhibit varying levels of compatibility with water, depending upon the nature of the starting materials employed for their preparation. In many cases, partial ionization with acetic acid, propionic acid and the like is required to effect or improve water compatibility or emulsifiability.

Preferably for curing at room temperature or lower temperatures an epoxide equivalent to amine hydrogen equivalent ratio of from 1:0.75 to 1:1.5 are generally employed. Suitable polyalkylene amines curing agents are those which are soluble or dispersible in water and which contain more than 2 active hydrogen atoms per molecule such as diethylenetriamine, triethylenetetramine, tetraethylenepentamine, etc. Other suitable curing agents include, for example, 2,2,4- and/or 2,4,4-trimethylhexamethylenediamine, 1,6-hexanediamine, 1-ethyl-1,3-propanediamine, 2,2(4),4-trimethyl-1,6-hexanediamine, bis(3-aminopropyl)piperazine, N-aminoethylpiperazine, N,N-bis(3-aminopropyl)ethylenediamine, 2,4(6)-toluenediamine and also cycloaliphatic amines such as 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophoronediamine, norboranediamine, 4,4'-diaminodicyclohexylmethane, 4,4'-diaminodicyclohexylmethane, 4,4'-diaminodicyclohexylpropane, 2,2-bis(4-aminocyclohexyl)propane, 3,3'-dimethyl-4,4'-diaminodicyclohexylmethane, 3-amino-1-cyclohexaneaminopropane, 1,3- and 1,4-bis(amino-methyl)-cyclohexane. As araliphatic amines, in particular those amines are employed in which the amino groups are present on the aliphatic radical for example m- and p-xylylenediamine or their hydrogenation products. The amines may be used alone or as mixtures.

Suitable amine-epoxide adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above.

Polyamidoamine curing agents can be obtained, for example by reacting polyamines with polycarboxylic acids such as dimerized fatty acids. In addition to the above polyamines, the water-soluble polyoxypropylene-diamines with molecular weights of 190 to 2,000 and also the readily water-dispersible curing agents, such as are described in the German Auslegeschrift 2,332,177 and the European Patent 0,000,605, for example, modified amine adducts are preferably employed. To cure the coating to completion, the coatings obtainable from these dispersions may also be heated for 30 to 120 minutes at an elevated temperature, preferably within the range of 50° C. to 120° C.

For higher temperature cure applications, aminoplast resins can be used as curing agents for epoxy resins having a high equivalent weight, e.g. greater than 700. Generally, from 5, preferably from 10, to 40, preferably to 30 weight percent of aminoplast resins, based on the combined weight of the epoxy resin and aminoplast resin, is used. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Examples of aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Commercial examples of water-compatible curing agents include EPI-CURE® 8535, 8536, 8537, 8290 and 8292 Curing Agents (available from Shell Chemical Co.), ANQUAMINE 401, Casamid 360 and 362 curing agents (Air Products); EPILINK 381 and DP660 curing agents (Akzo Chemical Co.); Hardener HZ350, Hardeners 92-113 and 92-116 (Ciba Geigy); BECKOPOX EH659W, EH623W, VEH2133W curing agents (Hoechst Celanese) and EPOTUF 37-680 and 37-681 curing agents (Reichhold Chemical Co.).

The curable epoxy resin composition can be cured at a temperature within the range of from 5° C., preferably from 20° C., to 200° C., preferably to 175° C. for a time effective to cure the epoxy resin.

The aqueous dispersions of the instant invention and curing agents described above can serve as components of paints and coatings for application to substrates such as, for example, metal and cementitious structures. To prepare such paints and coatings, these resins are blended with primary, extender and anti-corrosive pigments, and optionally, additives such as surfactants, antifoam agents, rheology modifiers and mar and slip reagents. The selection and amount of these pigments and additives depends on the intended application of the paint and is generally recognized by those skilled in the art.

Examples of primary pigments include rutile titanium dioxide, such as KRONOS® 2160(Kronos, Inc.) and TI-Pure® R-960 from Du Pont, buff titanium dioxide, red iron oxide, yellow iron oxide and carbon black. Examples of extender pigments include calcium meta silicate, such as 10ES WOLLASTOKUP®(NYCO Minerals, Inc.), barium sulfate, such as SPARMITE®(Harcros Pigments, Inc.) and aluminum silicate, such as ASP®170(Englehard Corp.). Examples of anticorrosive pigments include calcium strontium phosphosilicate, such as HALOX SW111 (Halox Pigments), zinc ion modified aluminum triphosphate, such as K-WHITE®84(Tayca Corp.) and basic aluminum zinc phosphate hydrate, such as HEUCOPHOS®ZPA(Heuco Tech, Ltd.).

Additional surfactants can be included in waterborne epoxy paints and coatings to improve both pigment and substrate wetting. Such surfactants are typically non-ionic, examples of which include TRITON® X-100 and TRITON X-405(Union Carbide), PLURONIC F-88 (BASF) and SURFYNOL® 104(Air Products and Chemicals).

Anti-foam agents and defoamers suppress foam generation during manufacture of the paint or coating. Useful defoamers include DREWPLUS®L-475(Drew Industrial Div.), DE FO®PF-4 Concentrate(Ultra Additives) and BYK®033 (BYK-Chemie).

Rheological additives are employed to obtain proper application properties. There are three types of additives that provide the desired thickening and shear thinning required for waterborne epoxy coatings; namely, hydroxyethylcellulose, organically modified hectorite clays and associative thickeners. NATROSOL®250 MBR and NATROSOL Plus(Aqualon) are examples of modified hydroxyethylcellulosics and BENTONE®LT(RHEOX, Inc.) is representative of a hectorite clay. ACRYSOL®QR-708(Rohm and Haas Co.) is an often useful associative thickener.

Mar and slip agents improve early resistance to abrasion from scrubbing or light foot traffic. Polydimethylsiloxanes and polyethylene waxes are used in this regard. An example of a commercially available wax is MICHEM LUBE®182 (MICHELMAN, INC.).

The curable paint and coating compositions can be applied to a substrate by brush, spray, or rollers.

The aqueous dispersions produced by the instant invention can also be used as components of adhesives and fiber sizing.

Illustrative Embodiment

The following illustrative embodiments describe the process of the invention and are provided for illustrative purposes and are not meant as limiting the invention.

Examples A–E demonstrate the process of the invention. The formation of the aqueous dispersion is compared with where acetone is added prior to the emulsification in the comparative examples.

EPON® Resin 828 (a diglycidyl ether of dihydric phenol having epoxy equivalent weight of 187–188) and EPON® Resin 1001F (an epoxy resin formed by advancing a diglycidyl ether of dihydric phenol with bisphenol-A having epoxy equivalent weight of 525–550), HELOXY® Modifier 62 (ortho-cresol glycidyl ether), HELOXY® Modifier 7 (alkyl $C_8$–$C_{10}$ glycidyl ether), HELOXY® Modifier 9 ($C_{10\text{-}11}$ alkyl glycidylether) or liquid epoxy diluent were obtained from Shell Chemical Company Polyethylene glycol monomethyl ether and polyethylene glyol were obtained from Aldrich Chemical Co. 2-methyl-1,5-pentanediamine (Dytek A) was obtained from DuPont.

Testing Methods

I. Viscosity Viscosities were determined on the obtained emulsion or dispersion by means of a Brookfield Synchro Lectric Viscometer from Brookfield Engineering Laboratories.

II. Particle Size The determination of emulsion and dispersion particle sizes was accomplished with a by a Coulter LS230 particle size analyzer (Area mean). All particle size data is reported in microns, $\mu$.

III. Percent Solids The percent solids of all products were measured by spreading a 0.5 gram sample of the product onto aluminum foil, placing the coated foil into a forced draft oven, held at 120 C, for 10 minutes, determining the residual weight of the film by ratioing the residual weight to the total weight and multiplying by 100.

IV. Weight per Epoxide The weight per epoxide (WPE or EEW) of all products was determined by drying a weighed amount of sample by means of azeotropic distillation with methylene chloride then titrating the residue by known methods and correcting for percent solids to determine the WPE at 100% solids content.

Preparation of Surfactant Precursor

EXAMPLE 1

Preparation of alpha-(2-carboxymethyl)-omega-methoxy-. poly(oxy-1,2-ethanediyl)

To a 3000 mL, four neck flask, fitted with a stirrer, thermocouple, air sparge tube, condenser and addition funnel, was added 495.6 grams (0.099 equiv.) of polyethylene glycol monomethyl ether of approximately 5000 Mn(Aldrich Chemical Co.), 15.4 grams (0.099 equiv) of 2,2,6,6-tetramethyl-l-piperidinyloxy, free radical (Aldrich Chemical Co., TEMPO, free radical) and 1000 grams of dichloromethane. The mixture was heated to reflux, then air was introduced into the mixture through the sparge tube. Next, concentrated nitric acid (15.4 grams) was then added over 15 minutes and the mixture was held at reflux for 19 hours. Volatiles were then removed by means of a rotary evaporator. The residue solidified upon cooling. It was ground to a powder, washed with 2-propanol and dried in a vacuum oven at 40° C. to constant weight. NMR Analysis confirmed conversion of hydroxyl to carboxyl functionality. The solid possessed an acid equivalent weight of 5025.

EXAMPLE 2

Preparation of Partially End Capped Amidoamine

Poly(ethylene glycol), 4,600 average molecular weight was oxidized to the corresponding acid using 4-Hydroxy-2,2,6,6-teramethyl-1-piperidinyloxy free radical in a similar manner to that described in Example 1. The resulting material had a weight per equivalent acid of 2735. This material was then amidified with 10 equivalents of primary amine per equivalent acid using Dytek A amine. This amido amine was isolated; 25% of the primary amine was capped with Cadura® E-10 epoxy and then diluted to approximately 65%NV with deionized water.

Preparation of Surfactant and Aqueous Dispersion

EXAMPLE A

Epoxy resin dispersion using surfactant from Example 2

To a 3-liter resin flask were added 532.76 grams EPON® Resin 828, 196.82 grams bisphenol A and 0.27 grams of ethyltriphenylphosphonium iodide. This catalyzed epoxy was then advanced to an epoxy equivalent weight of 675 at 170–191° C. This batch was allowed to cool to 149° C. and the following additions were made in respective order; 80.53 grams of EPON® R Resin 828, 24.55 grams of Arcosolv PM glycol ether and 89.12 grams of the surfactant solution described in Example 2 above. The batch solution was allowed to cool to 104° C. over 2 hours and then 110.19 grams of deionized water was added over 10 minutes with good mixing. Then the batch was mixed for an additional 30 minutes while the temperature dropped to 90° C. During this time the resin became emulsified in the aqueous continuous phase. After an additional 10 minutes of mixing the emulsion particle size was measured by a Coulter LS230 particle size analyzer. At this point the surface area mean particle size was 1.026 microns with 90% <2.502 and 99% <4.753 microns. To this emulsion was added 16.35 grams of Heloxy 9 liquid epoxy diluent and 27.76 grams of acetone over 10 minutes at 76–84° C. The particle size was measured again 25 minutes after this addition and it was surface area mean particle size 0.621 microns, 90% <1.332 and 99%<2.529. After the batch was mixed 55 minutes (from the addition of Heloxy 9/Acetone) at 76–81° C. the surface area mean particle size was 0.526 micron with 90% <0.923 and 99%<2.234. The batch was then thinned with additional 475 grams deionized water while allowing the temperature to drop to 85° C. The final properties of this batch measured at 25° C. after filtering through an 80 mesh polyester filter were 42,000 cp. viscosity, 57.4% NV and surface area mean particle size 0.411 microns, 90% <0.572 and 99% <0.865. As shown in Table I below, the invention process time saving was 60 minutes.

EXAMPLE B

Epoxy resin dispersion using surfactant from Example 2

The same composition as Example A was scaled up to 11 gallons using the same invention process. The particle size dropped very quickly after the HELOXY® 9 liquid epoxy diluent and Acetone were added (B-1) at 17 hours after inversion reaching a particle size of 0.73 microns in 22 hours and (B-2) 1 hour after inversion reaching a particle size of 0.52 microns in 22 hours. The particle size.

EXAMPLE C–E

Epoxy resin dispersions using Pluronic F88, glycidated polyoxyalkylene glycol

Epoxy resin dispersions using the surfactants; PLURONIC F-88 (polyoxyethyleneoxypropylene glycol from BASF having MW of 10,000), an addition product of diglycidyl ether of dihydric phenol, dihydric phenol and a diglycidyl ether of polyoxyalkylene glycol as described in Example 1 of U.S. Pat. No. 4,315,044; surfactant from Example 2 as Examples C, D, and E, respectively, were made in a similar manner to Example A except the surfactants were replaced weight per weight and for Example E, the HELOXY 9 Modifier was replaced by BEETLE 216-10 Resin from Cytec Industries (Urea-formaldehyde resin) on a non-volatile weight per weight basis. The results are listed in the Table III below.

TABLE I

| EXAMPLE NO. | Particle Size BEFORE Solvent ADD | Particle Size AFTER ADD | Particle Size AFTER ADD | FINAL Particle Size |
|---|---|---|---|---|
| Example C | 1.60 | 45 minutes 1.20 | | 0.83 |
| Example D | 2.782 | 35 minutes 0.761 | | 0.786 |
| Example E | 1.222 | 35 minutes 0.878 | 40 minutes 0.739 | Final 0.708 |

COMPARATIVE EXAMPLE A

Preparation of an dispersion without using the process of the invention

The same composition as Example A was made where acetone and HELOXY 9 Modifier were added before any water was added to emulsify the batch. EPON Resin 828, 613.29 grams is advanced with 196.82 grams of Bisphenol A to an epoxy equivalent weight of 535. Arcosolv PM glycol ether, 24.55 grams is added to the resin. This resin solution is then allowed to react with the Example 2 surfactant solution, 89.12 grams for one hour at 215° F. (102° C.). Then a blend of Heloxy 9 Modifier, 16.35 grams and Acetone 27.76 grams are admixed into the batch while allowing the batch to cool to 170° F. (77° C.). The resin is then allowed to emulsify by mixing in 119.11 grams of deionized water. After the resin is emulsified it is mixed for 25 minutes at ~165° F. (~73° C.) and then checked for particle size. The mean surface area particle size at this point is 0.784 microns. After an additional 2 hours 25 minutes of mixing the mean surface area particle size is 0.734 microns. As shown in the table immediately below, the comparative process does not reach as low as particle size as the process of the invention even with double the particle size reduction processing time. The final properties of this standard process batch were: 8,640 cP, 54.3% NV and mean average surface area particle size of 0.82.

TABLE II

| | 10 mins | 25 mins | 50 mins | 85 mins | 145 mins | Final | Time Saved |
|---|---|---|---|---|---|---|---|
| Comparative Example A | | 0.784 | | | 0.734 | 0.82 | |
| Example A | 1.021 | | 0.621 | 0.526 | | 0.41 | 60 mins |

* Coulter Counter LS230 surface area mean particle size

COMPARATIVE EXAMPLE B

Preparation of an dispersion without using the process of the invention

This batch was made with the same composition as comparative Example A: the acetone and HELOXY 9 Modifier were added before any water was added to emulsify the resin. This batch, (Comparative Example B-1) required greater than 20 hours of mixing to lower the Dn to <1.0 micron particle size. In a second attempt (Comparative Example B-2), to reach a particle size epoxy dispersion that would allow paints to be made with acceptable gloss it took over 50 hours to process. The results are shown in Table III below.

TABLE III

| Hours After Inver. | 1 | 2 | 3.5 | 16 | 18 | 20 | 22 | 31 | 39 | 50 | Time Saved |
|---|---|---|---|---|---|---|---|---|---|---|---|
| Comp. Ex. B-1 | | | 1.16 | | | 0.84 | | 0.90 Fin. | | | |
| Comp. Ex. B-2 | | | | 1.19 | | 1.00 | | | 0.87 | 0.60 Fin. | |
| Ex. B-1 | | | | 0.97 | 0.68 | | 0.73 Fin. | | | | ~17 hours |
| Ex. B-2 | 1.34 | 0.89 | | | | | 0.52 Fin. | | | | ~28 hours |

+ Brookhaven Dn average

Preparation of Paint

EXAMPLE I

Two Component Paint Formulations.

This white enamel paint performance as shown for Example B-2 epoxy dispersion with the curing agent E, described below, was obtained by dispersing the titanium dioxide into the curing agent to which acetic acid, pigment wetter and defoamer were added. The acetic acid was used at a level that was 0.12 equivalents acetic acid per total equivalents of titrateable nitrogen of the curing agent. The pigment to binder ratio in this paint was 0.7:1.0; the VOC was 1.2 pounds per gallon (composed of acetone and dipropylene glycol normal butyl ether in a weight ratio of 1:1 and the existing VOC introduced into the paint by the Example B-2 epoxy dispersion); and the combining ratio of equivalents of epoxy to amine hydrogen was 1.1 to 1.0.

Curing Agent E is a curing agent dispersion described as follows:

Detailed Procedure:

A 4 necked round-bottomed glass flask was equipped with a condenser having a water trap, a nitrogen inlet, a resin solution inlet and the amine inlet. The flask was flushed with nitrogen.

The amine (triethylenetetramine) (468.72g) was charged into the reactor and heated to 93 deg C. At 93 deg C a metered addition of the resin solution EPON® Resin 1001-X-75 (670g)to the amine was started at such a rate that the temperature of the reaction mixture did not exceed 121 deg C.

After completion of the addition, the mixture is kept at 93 deg C for additional 60 minutes. Excess amine and xylene were distilled off at about 140° C. under about 1.5 mmHg. The reaction product had an amine value of about 300 mg KOH/g. Subsequently the reaction mixture was cooled to 121° C. and 80.63 g of acid terminated polyalkyleneglycol surfactant (in solid form), representing a final surfactant level of about 3.2% on solids resin weight, were charged into the flask and heated to about 200° C. for 2 hours. The acid value of the reaction mixture was measured after 2 hours of reaction and a value of 2 mg KOH/g was found indicating that the reaction was completed.

Subsequently the reaction mixture was cooled to 93° C., after which 176.5 g of HELOXY® 62 Modifier, representing about 1 equivalent of epoxy per primary amine on the amine adduct, were added to the reaction vessel at a rate such that the maximum temperature did not exceed 121° C. After completion of the addition, the reaction was held at 93° C. for 60 minutes. The reaction mixture was allowed to cool to about 78° C. Water was dropwise added until the reaction mixture was inverted from a water in oil to an oil in for 60 minutes. The reaction mixture was allowed to cool to about 78° C. Water was dropwise added until the reaction mixture was inverted from a water in oil to an oil in water emulsion. Further water was added to a total amount of 882.37 g to obtain a final solids content of 45% by weight. The average particle size was 0.5μ.

Also shown in Table IV, the paint performance using the process of the invention with a curing agent dispersion which illustrates the excellent development of the paint protective performance properties of this invention.

TABLE IV

| Epoxy | Curing Agent | Set to Touch | Cure at RT | 60° Gloss % | Pencil Hardness | MEK D. Rubs |
|---|---|---|---|---|---|---|
| Example B-2 | E | 0.5 hour | 5 days | 95 | F | 60 |

The gloss for paint formulations using dispersions made by Examples B-1, B-2 and Comparative Examples B-1 and B-2 in a similar manner is shown below in Table V.

TABLE V

|  | 0.5 hours | 4 hours | 6 hours |
|---|---|---|---|
| * 20 degree/60 degree @ |  |  |  |
| Comparative Example B-1 | 80/100 | 48/91 | 22/71 |
| Example B-1 | 85/102 | 59/95 | 37/83 |
| + 20 degree/60 degree @ | 0.5 hours | 2.5 hours | 3.5 hours |
| Comparative Example B-2 | 34/78 | 34/78 | 26/73 |
| Example B-2 | 64/95 | 60/92 | 47/87 |

* 3 mil wet films
+ mil wet films

We claim:

1. A process for preparing an aqueous dispersion comprising the steps of
   a) emulsifying a mixture comprising
      i) water,
      ii) at least one epoxy resin having a functionality of greater than 0.8 epoxide group per molecule,
      iii) from 0.1 to 20 weight percent, based on the epoxy resin, of at least one polyoxyalkylene surfactant, and
      iv) optionally an acetone-free solvent solution to produce a resin-surfactant emulsion; and
   b) adding a solvent mixture to said resin-surfactant emulsion, said solvent mixture comprising i) acetone and ii) a non-volatile hydrophobic liquid resin or resin modifier to produce the aqueous dispersion.

2. The process of claim 1 wherein acetone is present in an amount of 0.5 to up to 5% of the total aqueous dispersion.

3. The process of claim 2 wherein the non-volatile hydrophobic liquid resin or resin modifier is present in an amount of 1 to 25% based on the total amounts of components a) ii), a) iii), and b) ii).

4. The process of claim 3 wherein the non-volatile hydrophobic liquid resin or resin modifier is an aliphatic monoglycidylether, urea formaldehyde resin, or an aliphatic monoglycidylester.

5. The process of claim 1 wherein the polyoxyalkylene oxide surfactant is a surfactant containing a polyoxyethylene or polyoxyethylene-oxypropylene block copolymer segment.

6. The process of claim 1 wherein the polyoxyalkylene oxide surfactant is an addition product comprising diglycidylether or dihydric phenol, dihydric phenol and a diglycidylether of polyoxyalkylene glycol.

7. The process of claim 6 wherein the polyoxyalkylene is a polyoxyethylene or polyoxyethylene-oxypropylene block copolymer segment.

8. The process of claim 1 wherein the polyoxyalkylene is at least one epoxy-functional surfactant prepared by reacting an amidoamine having the structures:

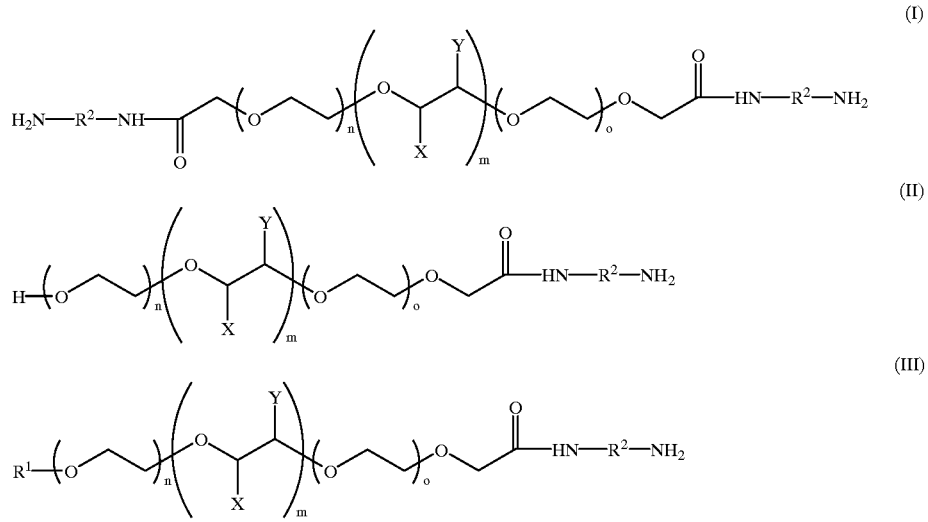

wherein R¹ is an alkyl, aryl, or arylalkyl group or mixtures thereof having 1 to 15 carbon atoms, R² is aliphatic, cycloaliphatic, or aromatic group having 2 to 18 carbon atoms optionally containing non-reactive oxygen or at most an average of 4 secondary and/or tertiary nitrogen atoms per structure in the backbone, X and Y are independently a hydrogen, methyl or ethyl group with the provision that if X is methyl or ethyl, Y is hydrogen or if Y is methyl or ethyl, X is hydrogen, and n+m+o is a real number from 40 to 400, and n+o is a real number in an amount effective to provide resin emulsification and wherein the ratio of (I) to (II) by weight is in the range of 100:0 to 0:100, the ratio of (I) to (III) by weight in the range of 100:0 to 0:100, and the ratio of (II) to (III) by weight in the range of 100:0 to 0:100, and at least one epoxy resin having a functionality of from greater than 0.8 epoxide group per molecule in an amine to epoxy equivalent ratio of at least 1:2 until the epoxy equivalents equal to the amine equivalents added are consumed.

9. The process of claim 8 wherein the at least one epoxy-functional surfactant is prepared by reacting amidoamine of structures (I) and (II) wherein the ratio of (I) to (II) by weight is in the range of 99:1 to 1:99 and the at least one epoxy resin.

10. The process of claim 9 wherein the ratio of (I) to (II) by weight is in the range of 20:80 to 80:20.

11. The process of claim 10 wherein m is 0.

12. The process of claim 1 wherein the epoxy resin has a functionality of at least 1.5 to 6.5 epoxide groups per molecule.

13. The process of claim 1 wherein the epoxy resin comprises a diglycidyl ether of a dihydric compound.

14. The process of claim 1 wherein the epoxy resin comprises a monoepoxide resin and a di- and/or a multifunctional epoxy resin.

* * * * *